(12) United States Patent
Del Sordo et al.

(10) Patent No.: US 8,984,549 B2
(45) Date of Patent: Mar. 17, 2015

(54) METHOD FOR TAG INSERTION AND NOTIFICATION FOR DVR ADDRESSABLE ADVERTISEMENT

(75) Inventors: Christopher S. Del Sordo, Souderton, PA (US); Brian J. Copley, Mansfield, MA (US); Brian D. Mullen, Duluth, GA (US); Scott D. Sellers, Quakertown, PA (US); Jay W. Strater, San Diego, CA (US); Yeqing Wang, Horsham, PA (US)

(73) Assignee: Google Technology Holdings LLC, Mountain View, CA (US)

( * ) Notice: Subject to any disclaimer, the term of this patent is extended or adjusted under 35 U.S.C. 154(b) by 431 days.

(21) Appl. No.: 13/246,909

(22) Filed: Sep. 28, 2011

(65) Prior Publication Data

US 2013/0081078 A1 Mar. 28, 2013

(51) Int. Cl.
| | |
|---|---|
| H04H 20/14 | (2008.01) |
| H04N 7/173 | (2011.01) |
| G06Q 30/02 | (2012.01) |
| H04N 21/433 | (2011.01) |
| H04N 21/44 | (2011.01) |
| H04N 21/442 | (2011.01) |
| H04N 21/45 | (2011.01) |
| H04N 21/658 | (2011.01) |
| H04N 21/81 | (2011.01) |

(52) U.S. Cl.
CPC ....... *G06Q 30/0241* (2013.01); *H04N 21/4331* (2013.01); *H04N 21/44016* (2013.01); *H04N 21/44222* (2013.01); *H04N 21/4532* (2013.01); *H04N 21/6582* (2013.01); *H04N 21/812* (2013.01)
USPC .................................................. 725/22; 725/24

(58) Field of Classification Search
CPC ..................... H04N 21/2668; H04N 21/4331
USPC .................................................. 725/22, 25, 24
See application file for complete search history.

(56) References Cited

U.S. PATENT DOCUMENTS

| | | | |
|---|---|---|---|
| 7,703,114 B2 | 4/2010 | Thukral | |
| 2006/0059509 A1* | 3/2006 | Huang et al. | 725/32 |
| 2007/0300250 A1* | 12/2007 | Smith et al. | 725/20 |
| 2010/0162322 A1 | 6/2010 | Roberts et al. | |
| 2010/0169910 A1* | 7/2010 | Collins et al. | 725/14 |
| 2010/0293566 A1* | 11/2010 | Valdez | 725/14 |
| 2012/0047530 A1* | 2/2012 | Shkedi | 725/34 |

* cited by examiner

*Primary Examiner* — Nasser Goodarzi
*Assistant Examiner* — Michael Hong
(74) *Attorney, Agent, or Firm* — Fish & Richardson P.C.

(57) ABSTRACT

A method and computing device that provides viewer impression data for a recorded digital video stream. The method receives a digital video stream as a series of segments, and stores it as a recorded digital video stream having a transition between two consecutive segments at a transition position. The method stores a notification tag that is associated with the transition, and that includes a tag position in the recorded digital video stream, a notification mode, and tag data. During playback of the recorded digital video stream, the method generates a play mode status event, and generates a transition notification when the playback encounters the notification tag and, based on the notification mode, the transition associated with the notification tag. The method collects viewer impression data for one of the two consecutive segments from the play mode status event and the transition notification.

25 Claims, 4 Drawing Sheets

METHOD FOR TAG INSERTION AND NOTIFICATION FOR DVR ADDRESSABLE ADVERTISEMENT

BACKGROUND

In a digital video broadcast system, a headend component uses Quadrature Amplitude Modulator (QAM) devices or Internet Protocol (IP) services to deliver audio/video (AV) content to a set-top box as a Moving Pictures Expert Group (MPEG) stream. The MPEG stream may include "live" advertisements or addressable advertisements (e.g., targeted advertisements). The addressable advertisements are placed in a parallel QAM or an IP service that is synchronized with the "live" advertisements. Software on the set-top box that includes a digital video recorder (DVR) determines whether to perform a transition to the addressable advertisement based on various traits, such as demographics, purchase history, observed behavior, or the like.

Impression reporting is a mechanism for gathering valuable information that is later used to decide how to better target the correct advertisement to the appropriate subscriber. Thus, there is a need to gather the information to determine whether the subscriber watched a particular advertisement, and their DVR activity or play mode status during playback. This DVR activity includes normal mode playback and trick mode playback, where trick mode playback includes pausing the playback, using skip to avoid watching a particular advertisement, or using fast-forward or rewind to either get to and watch a particular advertisement, or minimize the amount of time spent watching a particular advertisement. The change from normal mode playback to trick mode playback is referred to herein as a trick mode change.

The solution should associate tags with segment transitions in recorded content at strategic locations. The tag should store information that identifies the type of segment, and information about the segment. The solution should also provide a flexible notification mechanism that is not specific to any addressable advertisement system or triggering mechanism. The tags have a specialized notification mechanism that allow for notification during a playback operation relative to the segment transitions, and that provide information on the playback stream position and/or time of the notification.

There is a need for an impression data collecting mechanism for the playback of a recorded digital video stream that can be used to gather valuable information that is useful for deciding how to better target the correct advertisement to the appropriate subscriber. The presently disclosed invention satisfies this demand.

SUMMARY

Aspects of the present invention provide a method and computing device that provides viewer impression data for a recorded digital video stream. The method receives a digital video stream as a series of segments, and stores it as a recorded digital video stream having a transition between two consecutive segments at a transition position. The method stores a notification tag that is associated with the transition, and that includes a tag position in the recorded digital video stream, a notification mode, and tag data. During playback of the recorded digital video stream, the method generates a play mode status event, and generates a transition notification when the playback encounters the notification tag and, based on the notification mode, the transition associated with the notification tag. The method collects viewer impression data for one of the two consecutive segments from the play mode status event and the transition notification.

DETAILED DESCRIPTION

Figure 1:
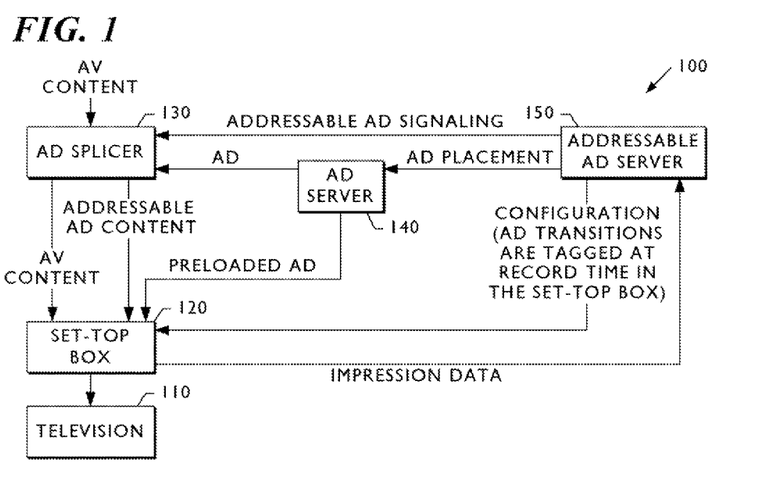
FIG. 1 is a block diagram that illustrates one embodiment of the hardware components of a system that performs the present invention.

FIG. 1 is a block diagram that illustrates one embodiment of the hardware components of a system that performs the present invention. An addressable advertising system 100 includes a television 110, set-top box 120, advertisement (Ad) splicer 130, advertisement (Ad) server 140, and addressable advertisement (Ad) server 150. In one embodiment, a network (not shown), such as a hybrid-fiber coaxial (HFC) network, connects the set-top box 120 and the television 110 to the Ad splicer 130, Ad server 140, and addressable Ad server 150.

The Ad splicer 130 is a computing device that receives audio/video (AV) content from an external source, Ad content from the Ad server 140, and addressable Ad signaling from the addressable Ad server 150. The AV content includes primary channels with SCTE 35, such as network programs and network advertisements. In one embodiment, the Ad content is a replacement for the primary network advertisement typically shown during a network program or between two network programs. The Ad splicer 130 synchronizes the Ad content and addressable Ad signaling with the network advertisements in the AV content, and delivers the resulting AV content stream and addressable Ad content to the set-top box 120.

The Ad server 140 is a computing device that receives Ad placement from the addressable Ad server 150 and provides the Ad content to the Ad splicer 130. In another embodiment, the Ad server 140 provides the Ad content as preloaded Ads to the set-top box 120.

The addressable Ad server 150 is a computing device that determines Ad placement in the AV content based on addressable Ad selection criteria. The addressable Ad server 150 sends the Ad placement to the Ad server 140, and addressable Ad signaling to the Ad splicer 130. The addressable Ad server 150 also configures the set-top box 120 to tag advertisement transitions in the AV content, and generate notifications during playback of the AV content for impression data collection.

The set-top box 120 is a computing device that connects the television 110, Ad splicer 130, Ad server 140, and addressable Ad server 150. The set-top box 120 is a digital video recorder (DVR) that a subscriber (not shown) operates to request a digital video stream from the Ad splicer 130, and stores it for viewing at another time on the television 110. The digital video stream includes the AV content and addressable Ad content. In another embodiment, the set-top box 120 receives the Ad content as preloaded Ad content from the Ad server 140. The set-top box 120 is configured by the addressable Ad server 150 to tag advertisement transitions in the AV content at record time, and generate notifications when it encounters the tags during playback of the AV content for impression data collection.

Figure 2:
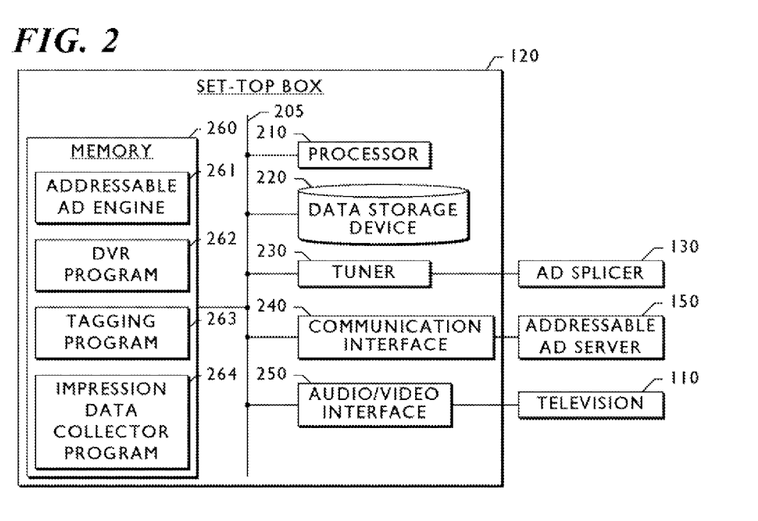
FIG. 2 is a block diagram that illustrates, in detail, one embodiment of the hardware components shown in FIG. 1.

FIG. 2 is a block diagram that illustrates, in detail, one embodiment of the hardware components shown in FIG. 1. In particular, FIG. 2 illustrates the hardware components and software comprising the set-top box 120 shown in FIG. 1.

The set-top box 120, in one embodiment, is a general-purpose computing device that performs the present invention. A bus 205 is a communication medium that connects a processor 210, data storage device 220 (such as a Serial ATA (SATA) hard disk drive, optical drive, Small Computer System Interface (SCSI) disk, flash memory, storage located remotely in the internet cloud, network attached storage, or the like), tuner 230, communication interface 240, audio/video interface 250, and memory 260 (such as Random Access Memory (RAM), Dynamic RAM (DRAM), non-volatile computer memory, flash memory, or the like). The tuner 230 connects the set-top box 120 to the Ad splicer 130. The communication interface 240 connects the set-top box 120 to the addressable Ad server 150. The audio/video interface 250 connects the set-top box 120 to the television 110. In one embodiment, a user (not shown) operates a radio frequency (RF) remote controller to communicate with the set-top box 120 via the television 110 and audio/video interface 250. In another embodiment, a keypad (not shown) is a user interface to the set-top box 120. In one embodiment, the implementation of the present invention on the set-top box 120 is an application-specific integrated circuit (ASIC).

The processor 210 performs the disclosed methods by executing the sequences of operational instructions that comprise each computer program resident in, or operative on, the memory 260. The reader should understand that the memory 260 may include operating system, administrative, and database programs that support the programs disclosed in this application. In one embodiment, the configuration of the memory 260 of the set-top box 120 includes an addressable ad engine 261, DVR program 262, tagging program 263, and impression data collector program 264 that perform the methods of the present invention disclosed in detail in FIG. 3, FIG. 4, FIG. 5, FIG. 6, and FIG. 7. When the processor 210 performs the disclosed methods, it stores intermediate results in the memory 260 or data storage device 220. In another embodiment, the memory 260 may swap programs, or portions thereof, in and out of the memory 260 as needed, and thus may include fewer than all of these programs at any one time.

Impression reporting relies upon an ability to obtain information that determines whether a consumer watched an addressable advertisement during a DVR playback operation. A DVR operation that uses the tagging mechanism of the present invention to gather impression reporting information would be local (i.e., from the DVR) and remote (i.e., from a multi-room DVR via a local area network, from a mobile device or networked device via a wireless streaming network, and the like) playback modes or Live Off Disc (LOD) modes. There is a need to integrate the tagging mechanism into the recording process by providing a mechanism to define tagging-based advertisement information, and allowing the information to be associated with strategic points in the recording. In one embodiment, the tagging program 263 of the present invention associates the tag before or after a transition either to or from an advertisement when recording content. This mechanism also must provide an asynchronous signaling mechanism to send the tagging information back to the impression data collector program 264 during playback of a LOD (or during a time-shifted playback) or playback of a pre-recorded session.

The asynchronous signaling mechanism gathers information during a variety of DVR playback mode operations to support impression data collection. In one embodiment, these playback modes operations include: (1) playback start and stop of previously recorded content; (2) playback start (from channel change or tuner swap) of a live recorded session (LOD or linear recording); (3) playback mode changes of live or previously recorded session; (4) transitions to or from live addressable advertisements; (5) transitions to or from pre-positioned advertisements; and (6) trick mode changes.

Tagging Advertisements When Recording

Figure 3:
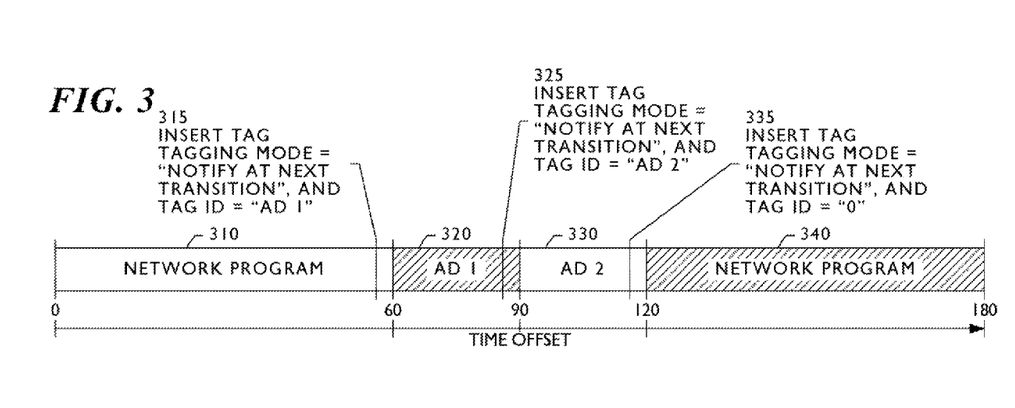
FIG. 3 is a schematic diagram that illustrates a digital video stream with advertisement tagging at recording according to one embodiment of the present invention.

FIG. 3 is a schematic diagram that illustrates a digital video stream with advertisement tagging at recording according to one embodiment of the present invention. The digital video stream shown in FIG. 3 includes four segments in a time sequence that begins at time offset 0 and ends at time offset 180. The first segment, beginning at time offset 0 and ending at time offset 60, is a first network program 310. The second segment, beginning at time offset 60 and ending at time offset 90, is a first advertisement 320. The third segment, beginning at time offset 90 and ending at time offset 120, is a second advertisement 330. The fourth segment, beginning at time offset 120 and ending at time offset 180, is a second network program 340. In one embodiment, the digital video stream shown in FIG. 3 is an LOD recording. In another embodiment, the second network program 340 is a continuation of the first network program 320. The transition from one segment to the next segment is carried out by prior art application program interface (API) calls. In one embodiment, an advertisement tune API call at time offset 60 may carry-out the transition from the first network program 310 to the first advertisement 320, an advertisement tune API call at time offset 90 may carry-out the transition from the first advertisement 320 to the second advertisement 330, and an advertisement tune API call may carry-out the transition from the second advertisement 330 to the second network program 340. The tagging program 263 in the set-top box 120 introduces new API calls (InsertTag and RemoveTag) for advertisement tagging in support of addressable advertising impression data collection (i.e., impression reporting).

The InsertTag API call associates an advertisement tag with a strategic point in the recording. In one embodiment, the InsertTag API associates the advertisement tag with the strategic point in the recording by inserting a record into a file, such as a content change record, associated with the recording. In one embodiment, the syntax of the InsertTag API is "InsertTag (RecordSessionId, TaggingMode, TagSize, TagData, ContentId, TagType, TagId)". TaggingMode, the notification mode for the tag, is either "tag at previous transition", "tag at next transition", "tag at the current point", or "do not notify". TagType distinguishes a tag for an addressable advertisement from other tag purposes so that the application does not get notified of all tags, but just those that it wants to receive. The response to the InsertTag API call returns the TagId, which the firmware in the set-top box 120 generates.

The RemoveTag API call removes an advertisement tag associated with a current active record session or from a playback session. In one embodiment, the syntax of the RemoveTag API is "RemoveTag (TagId, TagType, SessionId)". The tagging program 263 may call the RemoveTag API to remove a tag if it determines that an advertisement transition was not successful.

In the embodiment shown in FIG. 3, the tagging program 263 associates an advertisement tag with the recording position prior to each transition from one segment to the next segment. Each advertisement tag includes an advertisement identifier and relevant advertisement information. In one embodiment, the advertisement tag also includes information about the prior segment—advertisement or network program—to determine what content exists on either side of the transition. When the DVR program 262 is performing a trickplay event, such as fast-forward or skip-forward, an advantage of this approach is that it minimizes the frequency of advertisement tag notifications.

In the embodiment shown in FIG. 3, the tagging program 263 associates an advertisement tag with the recording position preceding an advertisement insertion point—tune or splice—in an LOD recording. The tagging program 263 calls the InsertTag API at a position 315 in the first network program 310 that precedes the transition from the first network program 310 to the first advertisement 320 with TaggingMode set to "tag at next transition". TagId is returned identifying the first advertisement 320. The tagging program 263 calls the InsertTag API at a position 325 in the first advertisement 320 that precedes the transition from the first advertisement 320 to the second advertisement 330 with TaggingMode set to "tag at next transition". TagId is returned identifying the second advertisement 330. The tagging program 263 calls the InsertTag API at a position 335 in the second advertisement 330 that precedes the transition from the second advertisement 330 to the second network program 340 with TaggingMode set to "tag at next transition". TagId is returned identifying the second network program 340 (e.g., 0). By contrast, in a pre-recorded recording embodiment, there is no need for an advertisement tag to precede an advertisement insertion point, and the tagging program 263 calls the InsertTag API at the beginning of a recorded pre-position advertisement (i.e., an advertisement that is recorded to a hard-disk drive in a file and itself is used to replace a network advertisement).

The tagging program 263 also provides a notification mode to determine the way the advertisement tag notification is sent during a playback operation. The tagging program 263 may associate the advertisement tag with the recording position prior to an upcoming transition to an advertisement, and it may ask that the advertisement tag notification be carried out when the subsequent addressable advertisement transition is made during playback. For example, if advertisement tags were associated with the recording after an advertisement transition, the TaggingMode would be set to indicate to "tag at previous transition".

In another embodiment, a pre-recorded advertisement may be associated with the recording after the recording starts (i.e., at the start of the file). When starting a recording, a transition is logged and the advertisement tag is associated with the recording with the notification mode being sent when the previous transition occurs.

Receiving Advertisement Transition Notifications During Normal Speed Playback

Figure 4:
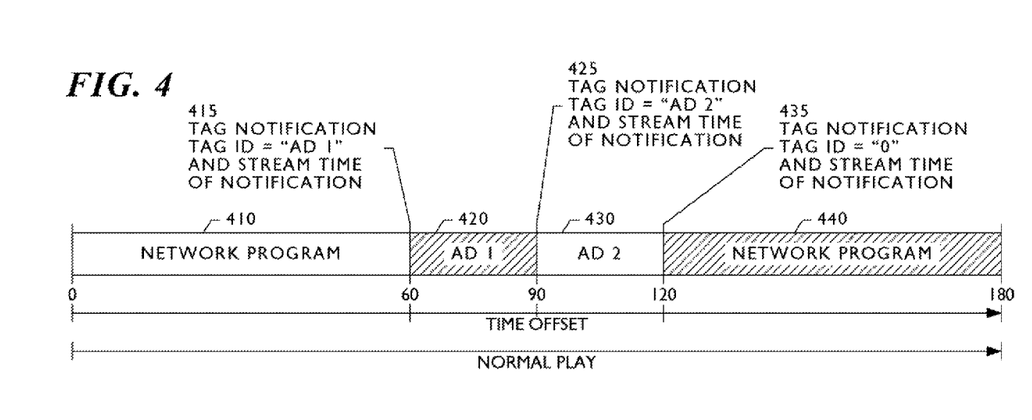
FIG. 4 is a schematic diagram that illustrates a digital video stream with asynchronous advertisement tagging notifications at transitions in the recording during a normal speed playback according to one embodiment of the present invention.

FIG. 4 is a schematic diagram that illustrates a digital video stream with asynchronous advertisement tagging notifications at transitions in the recording during a normal speed playback according to one embodiment of the present invention. The digital video stream shown in FIG. 4 includes four segments in a time sequence that begins at time offset 0 and ends at time offset 180. The first segment, beginning at time offset 0 and ending at time offset 60, is a first network program 410. The second segment, beginning at time offset 60 and ending at time offset 90, is a first advertisement 420. The third segment, beginning at time offset 90 and ending at time offset 120, is a second advertisement 430. The fourth segment, beginning at time offset 120 and ending at time offset 180, is a second network program 440. In one embodiment, the digital video stream shown in FIG. 4 is a video presentation that has been processed to include advertisement tagging in support of addressable advertising impression data collection. In another embodiment, the second network program 440 is a continuation of the first network program 420. The transition from one segment to the next segment during playback is carried out the DVR program 262, and a notification of the transition sent via an asynchronous tag notification. In one embodiment, the DVR program 262 at time offset 60 may carry-out the transition from the first network program 410 to the first advertisement 420 with notification of the transition via an asynchronous tag notification 415, at time offset 90 may carry-out the transition from the first advertisement 420 to the second advertisement 430 with notification of the transition via an asynchronous tag notification 425, and at time offset 120 may carry-out the transition from the second advertisement 430 to the second network program 440 with notification of the transition via an asynchronous tag notification 435. The impression data collector program 264 in the set-top box 120 introduces new API calls (RegisterTagNotification and UnregisterTagNotification) for advertisement tagging notification in support of addressable advertising impression data collection (i.e., impression reporting).

The RegisterTagNotification API call is typically made at the beginning of a playback session to register an application to receive asynchronous tag notifications when a playback session of a digital video stream passes (i.e., encounters) advertisement tags. In one embodiment, the syntax of the RegisterTagNotification API is "RegisterTagNotification (SessionId, TagType, ApplicationCallback)". TagType distinguishes a tag for an addressable advertisement from other tag purposes so that the application does not get notified of all tags, but just those that it wants to receive. When the digital video stream encounters an advertisement tag during a playback session, the ApplicationCallback receives the tag notification.

The UnregisterTagNotification API call is typically made at the end of a playback session to cancel the registration of an application to receive asynchronous tag notifications when a digital video stream encounters advertisement tags on a given playback session. In one embodiment, the syntax of the UnregisterTagNotification API is "UnregisterTagNotification (SessionId, TagType, ApplicationCallback)".

The DVR program 262 generates, and the impression data collector program 264 receives and collects, event information that captures events such as the start and stop of the video presentation—LOD or pre-recorded playback session—as shown in FIG. 4. The playback session shown in FIG. 4 begins at time offset 0 and ends at time offset 180. The playback session is in normal play mode beginning at time offset 0 and ending at time offset 180. In addition, the DVR program 262 generates advertisement transition events and changes in the playback mode for the session (e.g., normal-play, fast-forward, rewind, skip-forward, etc.) which occur after or before an inserted advertisement tag in the recording. These advertisement tags inserted in the recording provide a framework to understand whether a viewer requests fast-forward mode completely through an advertisement, or whether the viewer requests fast-forward mode until the playback gets into an advertisement and then continues in normal-play playback mode. The collection of this type of information is central to impression reporting and determining whether an advertisement is important to the viewer. It is also possible to use this information to program different pre-position advertisement presentation during playback operation.

Prior to time offset 0 in the digital video stream shown in FIG. 4, the impression data collector program 264 calls the RegisterTagNotification API to register the set-top box 120 to receive asynchronous tag notification responses when the digital video stream encounters an advertisement tag that was associated with the recorded stream to indicate an advertisement transition. Each asynchronous tag notification 415, 425, 435 will include the tag information included by the tagging program 263 for determining the content on either side of the transition. In one embodiment, the asynchronous tag notification includes the TagId, ContentId, TagData, PlaybackSessionId, an offset in the digital video stream (e.g., TIME_IN_SEC_CONTENT_POSITION), and GPS time of the notification. In one embodiment, the digital video stream includes one tag notification for each advertisement transition, in the order they were inserted.

In another embodiment, the tag notification at an advertisement transition occurs when an advertisement is a pre-positioned advertisement (i.e., hard-disk drive advertisement insertion), or addressable advertisement insertion, when the set-top box 120 supports that service.

Receiving Advertisement Transition Notifications During Trick Mode Playback

Figure 5:
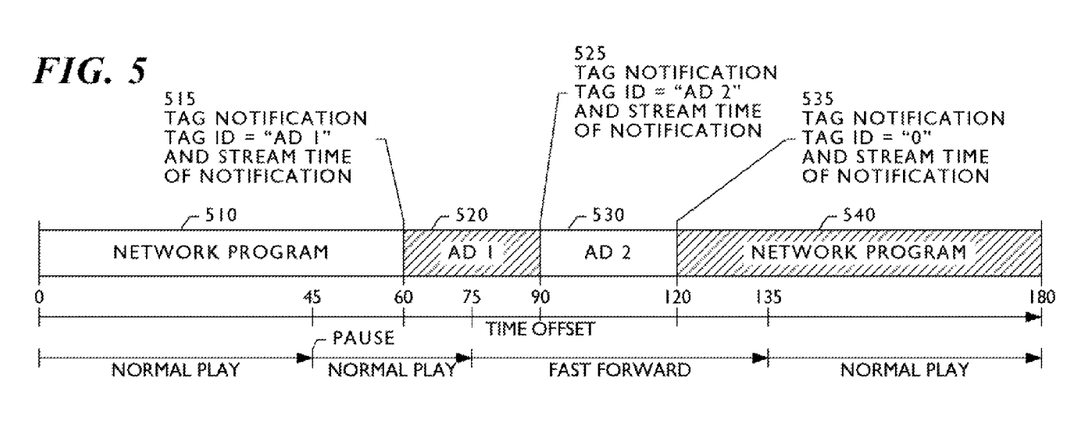
FIG. 5 is a schematic diagram that illustrates a digital video stream with asynchronous advertisement tagging notifications at transitions in the recording during a trick mode playback according to one embodiment of the present invention.

FIG. 5 is a schematic diagram that illustrates a digital video stream with asynchronous advertisement tagging notifications at transitions in the recording during a trick mode playback according to one embodiment of the present invention. The digital video stream shown in FIG. 5 includes four segments in a time sequence that begins at time offset 0 and ends at time offset 180. The first segment, beginning at time offset 0 and ending at time offset 60, is a first network program 510. The second segment, beginning at time offset 60 and ending at time offset 90, is a first advertisement 520. The third segment, beginning at time offset 90 and ending at time offset 120, is a second advertisement 530. The fourth segment, beginning at time offset 120 and ending at time offset 180, is a second network program 540. In one embodiment, the digital video stream shown in FIG. 5 is a video presentation that has been processed to include advertisement tagging in support of addressable advertising impression data collection. In another embodiment, the second network program 540 is a continuation of the first network program 520. During a playback session, the transition from one segment to the next segment is carried out by the DVR program 262, and a notification of the transition sent via an asynchronous tag notification. In one embodiment, the DVR program 262 at time offset 60 may carry-out the transition from the first network program 510 to the first advertisement 520 with notification of the transition via an asynchronous tag notification 515, at time offset 90 may carry-out the transition from the first advertisement 520 to the second advertisement 530 with notification of the transition via an asynchronous tag notification 525, and at time offset 120 may carry-out the transition from the second advertisement 530 to the second network program 540 with notification of the transition via an asynchronous tag notification 535. The impression data collector program 264 uses RegisterTagNotification and UnregisterTagNotification API calls, as described above, and introduces new API calls (RegisterPlaybackModeNotification and UnregisterPlaybackModeNotification) for playback mode change notification in support of addressable advertising impression data collection (i.e., impression reporting).

The RegisterPlaybackModeNotification API call is typically made at the beginning of a playback session to register an application to receive asynchronous notifications when playback mode changes occur for a given playback session. In one embodiment, the syntax of the RegisterPlaybackModeNotification API is "RegisterPlaybackModeNotification (ApplicationCallback, PlaybackSession)". When the digital video stream encounters a playback mode change, the ApplicationCallback receives the notification.

The UnregisterPlaybackModeNotification API call is typically made at the end of a playback session to cancel the registration of an application to receive asynchronous notifications when playback mode changes occur for a given playback session. In one embodiment, the syntax of the UnregisterPlaybackModeNotification API is "UnregisterPlaybackModeNotification (ApplicationCallback, PlaybackSession)".

The DVR program 262 generates, and the impression data collector program 264 receives and collects, event information that captures trick mode changes, in addition to, start and stop of the video presentation—LOD or pre-recorded playback session—as shown in FIG. 5. The playback session shown in FIG. 5 begins at time offset 0 and ends at time offset 180. The playback session is in normal-play mode beginning at time offset 0 and ending at time offset 45, when the viewer pauses the playback session. The viewer resumes the playback session at time offset 45. The playback session is in normal-play mode beginning at time offset 45 and ending at time offset 75. When the playback session passes time offset 60, the DVR program 262 generates an asynchronous tag notification 515 to notify of the transition from the first network program 510 to the first advertisement 520. The viewer requests to fast-forward the playback session at time offset 75 and cancels the fast-forward request at time offset 135. When the playback session passes time offset 90, the DVR program 262 generates an asynchronous tag notification 525 to notify of the transition from the first advertisement 520 to the second advertisement 530. When the playback session passes time offset 120, DVR program 262 generates an asynchronous tag notification 535 to notify of the transition from the second advertisement 530 to the second network program 540. The playback session is in normal-play mode beginning at time offset 135 and ending at time offset 180.

Prior to time offset 0 in the digital video stream shown in FIG. 5, the impression data collector program 264 calls the RegisterTagNotification API to register to receive asynchronous tag notification responses when the digital video stream encounters an advertisement tag that was associated with the recording to indicate an advertisement transition. The asynchronous tag notification will include the tag information included by the tagging program 263, as needed, for determining content on either side of the transition. In one embodiment, when a viewer requests to rewind the playback session the DVR program 262 needs to reverse the content information associated with the advertisement transition for proper interpretation (e.g., second advertisement 530 to first advertisement 520, rather than first advertisement 520 to second advertisement 530). The DVR program 262 has knowledge of the direction of the playback session (i.e., fast-forward, or rewind), and generates a PlaybackModeNotification. In one embodiment, the asynchronous tag notification includes the TagId, ContentId, TagData, PlaybackSessionId, an offset in the digital video stream (e.g., TIME_IN_SEC_CONTENT_POSITION), and GPS time of the notification.

Get Advertisement Tags to Learn of Skipped Advertisements

Figure 6:
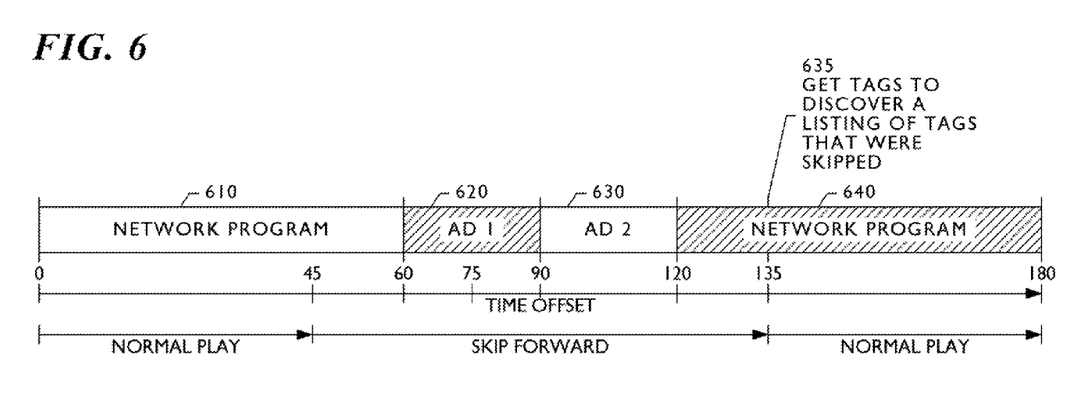
FIG. 6 is a schematic diagram that illustrates a digital video stream with asynchronous advertisement tagging notifications at transitions in the recording during a trick mode playback according to one embodiment of the present invention.

FIG. 6 is a schematic diagram that illustrates a digital video stream with asynchronous advertisement tagging notifications at transitions in the recording during a trick mode playback according to one embodiment of the present invention. The digital video stream shown in FIG. 6 includes four segments in a time sequence that begins at time offset 0 and ends at time offset 180. The first segment, beginning at time offset 0 and ending at time offset 60, is a first network program 610. The second segment, beginning at time offset 60 and ending at time offset 90, is a first advertisement 620. The third segment, beginning at time offset 90 and ending at time offset 120, is a second advertisement 630. The fourth segment, beginning at time offset 120 and ending at time offset 180, is a second network program 640. In one embodiment, the digital video stream shown in FIG. 6 is a video presentation that has been processed to include advertisement tagging in support of addressable advertising impression data collection. In another embodiment, the second network program 640 is a continuation of the first network program 620. The transition from one segment to the next segment during playback is carried out by the DVR program 262, and a notification of the transition sent via an asynchronous tag notification. In one embodiment, the DVR program 262 at time offset 60 may carry-out the transition from the first network program 610 to the first advertisement 620 with notification of the transition via an asynchronous tag notification, at time offset 90 may carry-out the transition from the first advertisement 620 to the second advertisement 630 with notification of the transition via an asynchronous tag notification, and at time offset 120 may carry-out the transition from the second advertisement 630 to the second network program 640 with notification of the transition via an asynchronous tag notification. The impression data collector program 264 uses the RegisterTagNotification and UnregisterTagNotification API calls, as described above, for advertisement tagging notification in support of addressable advertising impression data collection (i.e., impression reporting).

The DVR program 262 generates, and the impression data collector program 264 receives and collects, event information that captures normal playback events following a skip, in addition to, start and stop of the video presentation—LOD or pre-recorded playback session—as shown in FIG. 6. The playback session shown in FIG. 6 begins at time offset 0 and ends at time offset 180. The playback session is in normal-play mode beginning at time offset 0 and ending at time offset 45, when the viewer requests to skip-forward in the playback session. The DVR program 262 does not generate any asynchronous tag notifications because the viewer requested to skip the transition from the first network program 610 to the first advertisement 620, the transition from the first advertisement 620 to the second advertisement 630, and the transition from the second advertisement 630 to the second network program 640. When the DVR program 262 resumes the playback session at time offset 135, it generates a "skip" play mode notification. When the impression data collector program 264 receives the "skip" play mode notification, it generates a request (GetTags) to get the notification tags that were skipped, and receives a list of the asynchronous tag notifications that were skipped. The playback session is in normal-play mode beginning at time offset 135 and ending at time offset 180.

The GetTags API call returns a list of tags that are associated with a current recording session or a playback session. The GetTags API may be called at any time, but is typically called following a skip-forward mode to discover which advertisements, if any, were skipped. In one embodiment, the syntax of the GetTags API is "GetTags (SessionId, TagType)". SessionId refers to a playback session. If the playback session is an LOD session, the impression data collector program 264 should not wait until the end of the LOD session to make the GetTags API call because the LOD session has a circular buffer. The GetTags API call will return the number of tags and, for each tag, the TagId, ContentId, TagData, TagType, PlaybackSessionId, and an offset in the digital video stream (e.g., TIME_IN_SEC_CONTENT_POSITION) of where the tag notification was associated with the tag mode (e.g., advertisement transition point).

Figure 7:
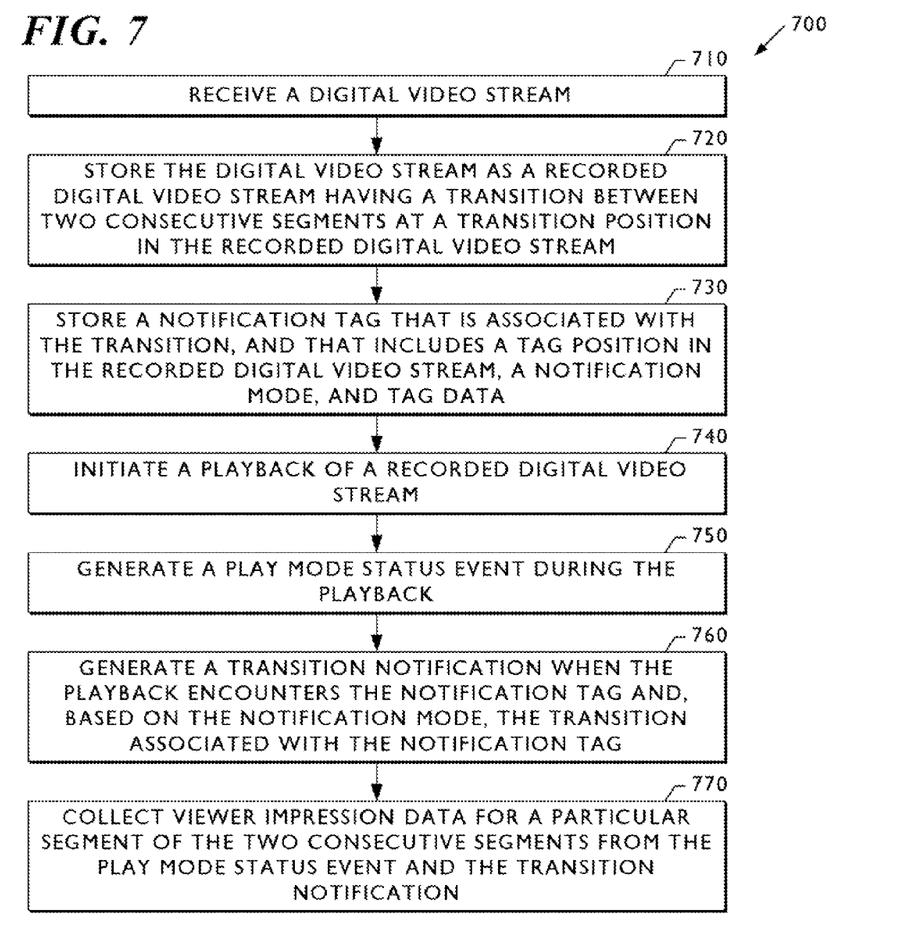
FIG. 7 is a flow diagram that illustrates a method of advertisement tagging at recording and tag notification at playback according to one embodiment of the present invention.

FIG. 7 is a flow diagram that illustrates a method of advertisement tagging at recording and tag notification at playback according to one embodiment of the present invention. The process 700 shown in FIG. 7 begins when the set-top box 120 receives a digital video stream as a series of segments (step 710). The process 700 stores the digital video stream as a recorded digital video stream having a transition between two consecutive segments at a transition position in the recorded digital video stream (step 720). The process 700 stores a notification tag that is associated with the transition, and that includes a tag position in the recorded digital video stream, a notification mode, and tag data (step 730). The process 700 initiates a playback of the recorded digital video stream (step 740), and generates a play mode status event during the playback (step 750). The process 700 generates a transition notification when the playback encounters the notification tag and, based on the notification mode, the transition associated with the notification tag (step 760). The process 700 collects viewer impression data for a particular segment of the two consecutive segments from the play mode status event and the transition notification (step 770).

Although the disclosed embodiments describe a fully functioning method and computing device for associating tags with a recorded digital video stream to support transition notification and impression data collection, the reader should understand that other equivalent embodiments exist. Since numerous modifications and variations will occur to those reviewing this disclosure, the method and system for associating tags with a recorded digital video stream to support transition notification and impression data collection is not limited to the exact construction and operation illustrated and disclosed. Accordingly, this disclosure intends all suitable modifications and equivalents to fall within the scope of the claims.

We claim:

1. A method, comprising:
receiving a digital video stream that includes a series of segments;
storing the digital video stream as a recorded digital video stream having a transition between two consecutive segments at a transition position in the recorded digital video stream;
inserting, into the recorded digital video stream, a notification tag that is associated with the transition, the notification tag specifying i) a tag position in the recorded digital video stream that is relative to and offset from the transition, ii) a notification mode specifying that a transition notification is to be generated at the occurrence of the relative next transition, and iii) tag data;
initiating a playback of the recorded digital video stream;
for each change in a play mode during the playback, generating a play mode status event during the playback, the play mode status event indicating at least one of play, fast forward, or rewind play mode;
generating a transition notification when the playback encounters:
the notification tag; and
based on the notification mode specified by the notification tag, the transition relative to the notification tag; and
collecting viewer impression data for a particular segment of the two consecutive segments from the play mode status event and the transition notification.

2. The method of claim 1, wherein the receiving of the digital video stream further comprises:
receiving audio/video content that includes at least one network program segment and at least one network advertisement segment;
receiving addressable advertisement content that includes at least one addressable advertisement segment, each addressable advertisement segment synchronized with one of the network advertisement segments; and
creating the digital video stream by combining the audio/video content and the addressable advertisement content based on traits attributed to a viewer of the audio/video content.

3. The method of claim 1, wherein the tag position is a stream time in the recorded digital video stream.

4. The method of claim 1, wherein the notification mode determines the tag position in the recorded digital video stream.

5. The method of claim 1, wherein the tag data includes an identification of at least one of the two consecutive segments at the transition associated with the notification tag.

6. The method of claim 1, wherein the inserting of the notification tag further comprises:
inserting the notification tag in a file associated with the recorded digital video stream.

7. The method of claim 1, wherein the initiating of the playback further comprises:
registering to receive the transition notification during the playback.

8. The method of claim 1, wherein the initiating of the playback further comprises:
registering to receive the play mode status event during the playback.

9. The method of claim 1, further comprising:
changing the playback to a trick mode playback,
wherein the play mode status event for the change to the trick mode playback is at least one of fast forward, rewind, and skip.

10. The method of claim 4, wherein when the notification mode is "tag at previous transition", the tag position follows the transition position associated with the notification tag, wherein when the notification mode is "tag at next transition", the tag position precedes the transition position associated with the notification tag, wherein when the notification mode is "tag at current position", the tag position is the transition position associated with the notification tag, and wherein when the notification mode is "do not notify", the transaction notification is disabled when the playback encounters the notification tag.

11. The method of claim 9, wherein when the play mode status event for the change to the trick mode playback is fast forward, or rewind, the generating of the transition notification occurs when the trick mode playback encounters the notification tag and, based on the notification mode, the transition associated with the notification tag.

12. The method of claim 9, wherein when the play mode status event for the change to the trick mode playback is skip, the generating of the transition notification further comprises:
generating a request for skipped transition notifications from a first position in the recorded digital video stream where the skip trick mode playback was initiated to a second position in the recorded digital video stream where the playback resumes; and
receiving a list of at least one notification skipped during the trick mode playback.

13. A computing device, comprising:
a memory device resident in the computing device; and
a processor disposed in communication with the memory device, the processor configured to:
receive a digital video stream that includes a series of segments;
store the digital video stream as a recorded digital video stream having a transition between two consecutive segments at a transition position in the recorded digital video stream;
insert into the recoded digital video stream a notification tag that is associated with the transition, the notification tag specifying i) a tag position in the recorded digital video stream that is relative to and offset from the transition, ii) a notification mode specifying that a transition notification is to be generated at the occurrence of the relative next transition, and iii) tag data;
initiate a playback of the recorded digital video stream;
for each change in a play mode during the playback, generate a play mode status event during the playback, the play mode status event indicating at least one of play, fast forward, or rewind play mode;
generate a transition notification when the playback encounters:
the notification tag; and
based on the notification mode specified by the notification tag, the transition relative to the notification tag; and
collect viewer impression data for a particular segment of the two consecutive segments from the play mode status event and the transition notification.

14. The computing device of claim 13, wherein to receive the digital video stream, the processor is further configured to:
receive audio/video content that includes at least one network program segment and at least one network advertisement segment;
receive addressable advertisement content that includes at least one addressable advertisement segment, each addressable advertisement segment synchronized with one of the network advertisement segments; and
create the digital video stream by combining the audio/video content and the addressable advertisement content based on traits attributed to a viewer of the audio/video content.

15. The computing device of claim 13, wherein the tag position is a stream time in the recorded digital video stream.

16. The computing device of claim 13, wherein the notification mode determines the tag position in the recorded digital video stream.

17. The computing device of claim 13, wherein the tag data includes an identification of at least one of the two consecutive segments at the transition associated with the notification tag.

18. The computing device of claim 13, wherein to inset the notification tag, the processor is further configured to:

insert the notification tag in a file associated with the digital video stream.

19. The computing device of claim 13, wherein to initiate the playback, the processor is further configured to:
register to receive the transition notification during the playback.

20. The computing device of claim 13, wherein to initiate the playback, the processor is further configured to:
register to receive the play mode status event during the playback.

21. The computing device of claim 13, wherein the processor is further configured to:
change the playback to a trick mode playback,
wherein the play mode status event for the change to the trick mode playback is at least one of fast forward, rewind, and skip.

22. The computing device of claim 16, wherein when the notification mode is "tag at previous transition", the tag position follows the transition position associated with the notification tag, wherein when the notification mode is "tag at next transition", the tag position precedes the transition position associated with the notification tag, wherein when the notification mode is "tag at current position", the tag position is the transition position associated with the notification tag, and wherein when the notification mode is "do not notify", the transaction notification is disabled when the playback encounters the notification tag.

23. The computing device of claim 21, wherein when the play mode status event for the change to the trick mode playback is fast forward, or rewind, the generating of the transition notification occurs when the trick mode playback encounters the notification tag and, based on the notification mode, the transition associated with the notification tag.

24. The computing device of claim 21, wherein when the play mode status event for the change to the trick mode playback is skip, to generate the transition notification, the processor is further configured to:
generate a request for skipped transition notifications from a first position in the recorded digital video stream where the skip trick mode playback was initiated to a second position in the recorded digital video stream where the playback resumes; and
receive a list of at least one transition notification skipped during the trick mode playback.

25. A non-transitory computer-readable medium, comprising computer-executable instructions that, when executed on a computing device, perform steps of:
receiving a digital video stream that includes a series of segments;
storing the digital video stream as a recorded digital video stream having a transition between two consecutive segments at a transition position in the recorded digital video stream;
inserting, into the recorded digital video stream, a notification tag that is associated with the transition, the notification tag specifying i) a tag position in the recorded digital video stream that is relative to and offset from the transition, ii) a notification mode specifying that a transition notification is to be generated at the occurrence of the relative next transition, and iii) tag data;
initiating a playback of the recorded digital video stream;
for each change in a play mode during the playback, generating a play mode status event during the playback, the play mode status event indicating at least one of play, fast forward, or rewind play mode;
generating a transition notification when the playback encounters:
the notification tag; and
based on the notification mode specified by the notification tag, the transition relative to the notification tag; and
collecting viewer impression data for a particular segment of the two consecutive segments from the play mode status event and the transition notification.

\* \* \* \* \*